United States Patent
Kotake et al.

(10) Patent No.: US 10,042,788 B2
(45) Date of Patent: Aug. 7, 2018

(54) STORAGE SYSTEM AND METHOD FOR CONTROLLING COMMAND TRANSMISSION

(71) Applicant: Hitachi, Ltd., Tokyo (JP)

(72) Inventors: Yuki Kotake, Tokyo (JP); Tomohisa Ogasawara, Tokyo (JP); Toru Ando, Tokyo (JP); Hidechika Nakanishi, Tokyo (JP); Yukiyoshi Takamura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 2 days.

(21) Appl. No.: 15/510,075

(22) PCT Filed: Dec. 4, 2014

(86) PCT No.: PCT/JP2014/082068
§ 371 (c)(1),
(2) Date: Mar. 9, 2017

(87) PCT Pub. No.: WO2016/088231
PCT Pub. Date: Jun. 9, 2016

(65) Prior Publication Data
US 2017/0308486 A1    Oct. 26, 2017

(51) Int. Cl.
*G06F 13/16* (2006.01)
*G06F 13/42* (2006.01)
*G06F 13/40* (2006.01)

(52) U.S. Cl.
CPC ...... *G06F 13/1673* (2013.01); *G06F 13/1605* (2013.01); *G06F 13/4068* (2013.01); *G06F 13/4282* (2013.01)

(58) Field of Classification Search
CPC .................................................. G06F 13/1605
See application file for complete search history.

(56) References Cited

U.S. PATENT DOCUMENTS

| | | | |
|---|---|---|---|
| 6,862,642 B1* | 3/2005 | Packer | G06F 11/0745 326/9 |
| 2013/0179595 A1* | 7/2013 | Chikusa | G06F 3/0613 710/2 |
| 2014/0195714 A1 | 7/2014 | Yendigiri et al. | |

* cited by examiner

*Primary Examiner* — Farley Abad
(74) *Attorney, Agent, or Firm* — Procopio, Cory, Hargreaves and Savitch LLP

(57) ABSTRACT

In a first system among first and second systems being a duplexed system as a path to a storage device, in a first SAS expander including a first port directly coupled to a storage device, buffer-on signifying that buffering is to be performed by the first SAS expander is configured with respect to the first port. In the second system, in a second SAS expander including a second port directly coupled to the same storage device, buffer-off signifying that buffering is not to be performed by the second SAS expander is configured with respect to the second port. By selecting any of the first system and the second system as a path of a command, whether or not the command is to be buffered by the first or second SAS expander directly coupled to a storage device serving as a destination of the command is determined.

15 Claims, 17 Drawing Sheets

Device management table
361A

| 201A | 202A | 203A | 204A |
|---|---|---|---|
| Device number | Transfer rate | CH0 queue counter | CH1 queue counter |
| 1 | 6 Gbps | 0 | 0 |
| 2 | 6 Gbps | 0 | 0 |
| 3 | 12 Gbps | 0 | 0 |
| 4 | 12 Gbps | 0 | 0 |
| 5 | 6 Gbps | 0 | 0 |
| ... | ... | ... | ... |

AWT acceleration table
421A

| Device number | AWT acceleration flag | AWT additional value |
|---|---|---|
| 1 | 0 | 10 |
| 2 | 0 | 10 |
| 3 | 1 | 10 |
| 4 | 0 | 10 |
| 5 | 0 | 10 |
| 6 | 0 | 10 |
| ... | ... | ... |

FIG. 12

Device management table
362B

| Device number | Transfer rate | CH0 queue counter | CH1 queue counter | CH0 buffer | CH1 buffer |
|---|---|---|---|---|---|
| 1 | 6 Gbps | 0 | 0 | On | On |
| 2 | 6 Gbps | 0 | 0 | On | On |
| 3 | 12 Gbps | 0 | 0 | On | Off |
| 4 | 12 Gbps | 0 | 0 | On | Off |
| 5 | 6 Gbps | 0 | 0 | On | On |
| ... | ... | ... | ... | ... | ... |

FIG. 15

Device management table
363A

| Device number 201A | Expander number 1501A | Transfer rate 202A | CH0 queue counter 203A | CH1 queue counter 204A | CH0 buffer 1502A | CH1 buffer 1503A | Priority CH 1504A |
|---|---|---|---|---|---|---|---|
| 1 | 1 | 12 Gbps | 0 | 0 | On | Off | 1 |
| 2 | 1 | 12 Gbps | 0 | 0 | Off | On | 0 |
| 3 | 1 | 6 Gbps | 0 | 0 | Off | On | 1 |
| 4 | 1 | 6 Gbps | 0 | 0 | On | On | 1 |
| 5 | 1 | 6 Gbps | 0 | 0 | On | Off | 0 |
| 6 | 1 | 6 Gbps | 0 | 0 | Off | On | 0 |
| 7 | 2 | 6 Gbps | 0 | 0 | On | Off | 1 |
| 8 | 2 | 6 Gbps | 0 | 0 | On | Off | 0 |
| ... | ... | ... | ... | ... | ... | ... | ... |

STORAGE SYSTEM AND METHOD FOR CONTROLLING COMMAND TRANSMISSION

CROSS-REFERENCE TO RELATED APPLICATIONS

This application is a U.S. National Stage entry of PCT Application No: PCT/JP2014/082068 filed Dec. 4, 2014, the contents of which are incorporated herein by reference.

TECHNICAL FIELD

The present invention generally relates to controlling command transmission to a storage device coupled to an SAS (Serial Attached SCSI) expander.

BACKGROUND ART

An SAS expander (hereinafter, an expander) which enables on/off of a buffer to be configured is known. Buffer-on signifies that a buffer function is in an on state. When buffer-on is configured, the expander performs buffering. Buffer-off signifies that the buffer function is in an off state. When buffer-off is configured, the expander does not perform buffering. The expander includes a plurality of ports (phy) and enables on/off of the buffer to be configured for each port.

It is also known that transfer rates of expanders include an old standard and a new standard. A transfer rate conforming to the old standard is generally 6 Gbps and a transfer rate conforming to the new standard is generally 12 Gbps. Both a new standard-compliant storage device (hereinafter, a high-speed storage device) and an old standard-compliant storage device (hereinafter, a low-speed storage device) can be coupled to a new standard-compliant expander.

In a new standard-compliant expander, a port to which a low-speed storage device is coupled is favorably configured to buffer-on. This is because a transfer rate of the low-speed storage device is lower than that of the new standard-compliant expander and, therefore, high-speed transfer cannot be performed. On the other hand, in a new standard-compliant expander, a port to which a high-speed storage device is coupled is desirably configured to buffer-off. This is because, when buffering is performed despite being capable of high-speed transfer, the buffering may cause a decline in performance.

PTL 1 discloses dynamically switching a buffer on/off. According to PTL 1, when a conflict occurs during I/O (Input/Output) to/from a high-speed storage device, a port coupled to the high-speed storage device is configured to buffer-on. Therefore, data can be temporarily stored in a buffer of an expander during an I/O conflict and, after the I/O conflict is resolved, the data can be transferred to a high-speed storage device from the buffer of the expander. Accordingly, time loss of data transfer can be reduced.

CITATION LIST

Patent Literature

[PTL 1]

SUMMARY OF INVENTION

Technical Problem

According to the description given above, a buffer is favorably dynamically switched on/off.

However, it is difficult to switch a buffer on/off at high speed. For example, in order to switch from buffer-on to buffer-off, all untransferred data stored in the buffer must be transferred from the buffer and the data transfer may be time-consuming.

In addition, since it is difficult to predict a frequency of I/O conflict with a storage device, it is also difficult to configure on/off of a buffer in advance so as to conform to the frequency of I/O conflict.

Solution to Problem

A storage system includes: a plurality of storage devices; a first system coupled to the plurality of storage devices; and a second system coupled to the plurality of storage devices. The first system includes: one or more serial first SAS expanders having a plurality of first ports respectively coupled to the plurality of storage devices; and a first controller coupled to the one or more first SAS expanders. The second system includes: one or more serial second SAS expanders having a plurality of second ports respectively coupled to the plurality of storage devices; and a second controller coupled to the one or more second SAS expanders. The first and second controllers are coupled so as to be capable of communicating with each other. At least one of the first and second controllers is configured to, with respect to a target storage device which is any of the plurality of storage devices: (A) configure, in a first SAS expander having a first port directly coupled to the target storage device, buffer-on signifying that buffering is performed by the first SAS expander with respect to the first port; and (B) configure, in a second SAS expander having a second port directly coupled to the target storage device, buffer-off signifying that buffering is not performed by the second SAS expander with respect to the second port. By selecting any of the first system and the second system as a path of a command transmitted by any of the first and second controllers, whether or not the command is to be buffered by the first or second SAS expander directly coupled to a storage device serving as a destination of the command is determined.

Advantageous Effects of Invention

A command can be transmitted to a storage device via an expander of which an on/off configuration of a buffer is in an appropriate state without dynamically switching a buffer on/off.

BRIEF DESCRIPTION OF DRAWINGS

FIG. 12 shows a configuration of a device management table according to Embodiment 3.

FIG. 15 shows a configuration of a device management table according to Embodiment 4.

DESCRIPTION OF EMBODIMENTS

Hereinafter, several embodiments will be described.

Although information may be described below using the expression "an AAA table", information may be expressed using any kind of data structure. In other words, "an AAA table" can also be referred to as "AAA information" in order to show that information is not dependent on data structure.

Furthermore, while a number is used as an ID (identification information) of various targets (for example, a server or a port) in the following description, other types of information may be used in place of, or in addition to, a number.

In addition, while a "program" is sometimes used as a subject when describing a process in the following description, since a program causes a prescribed process to be performed by appropriately using a storage resource (such as a memory) and/or a communication interface apparatus (such as a port) when being executed by a processor (such as a CPU (Central Processing Unit)) included in a controller, a "processor" may be used instead as a subject of a process. A process described using a program as a subject may be considered a process performed by a controller. Furthermore, the controller may be a processor itself or may include in place of, or in addition to, the processor, a hardware circuit which performs a part of or all of the processes to be performed by the processor. A computer program may be installed to a storage controller from a program source. The program source may be, for example, a program distribution server or a storage medium that can be read by a computer.

Furthermore, in the following description, when describing elements of a same type while distinguishing the elements from one another, reference signs of the elements may be used. However, when describing elements of a same type while distinguishing the elements from one another, only a shared sign among the reference signs of the elements may be used.

Embodiment 1

Figure 1:
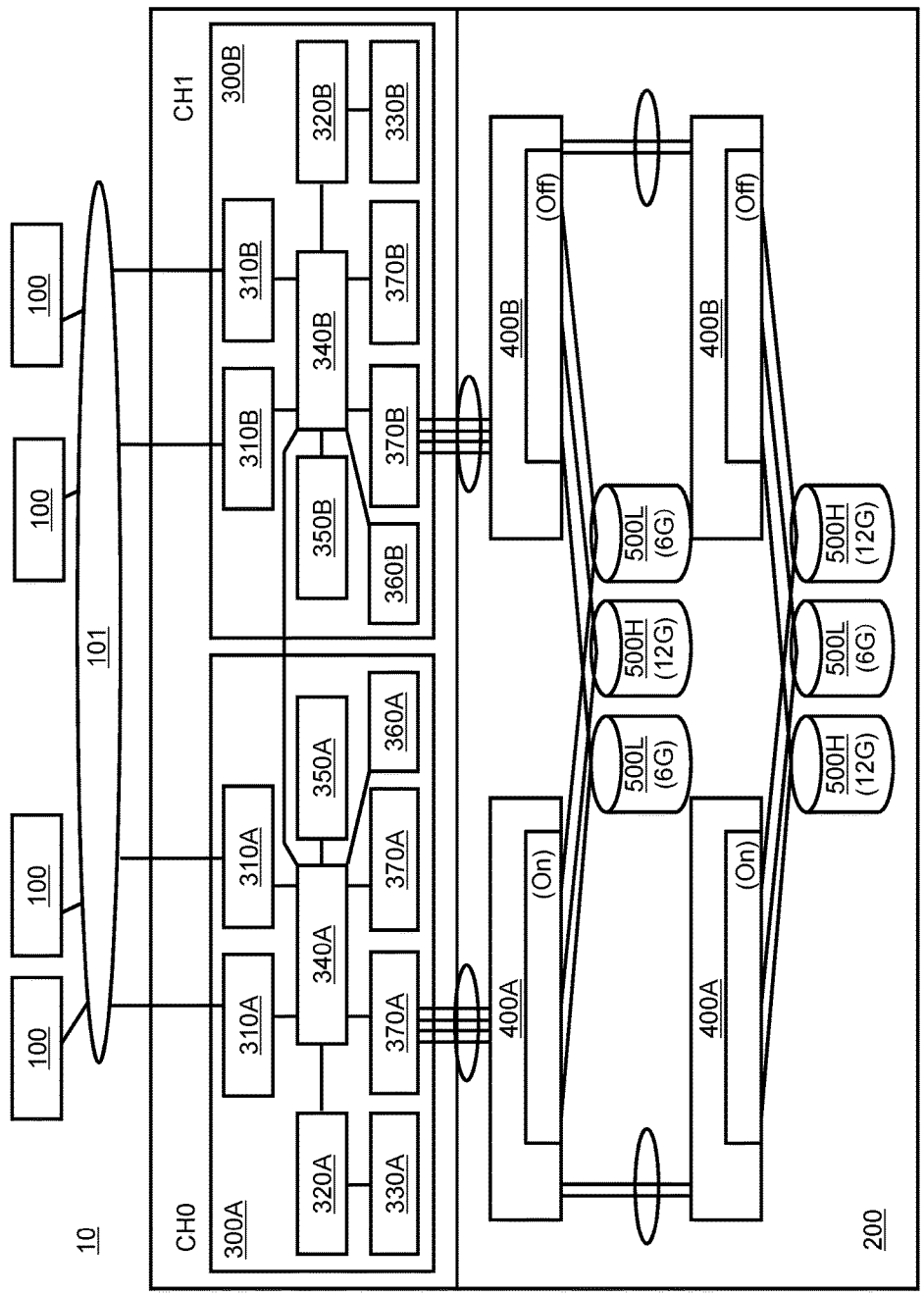
FIG. 1 shows a configuration of a computer system according to Embodiment 1.

FIG. 1 shows a configuration of a computer system according to Embodiment 1.

A computer system 10 includes one or more host computers (hereinafter, hosts) 100 and a storage system 200. The host 100 and the storage system 200 are coupled via, for example, a LAN (Local Area Network) 101. Other communication networks may be adopted in place of the LAN 101.

The host 100 transmits an I/O (Input/Output) request of user data to the storage system 200. User data refers to data stored by the host 100 in a logical volume. The I/O request includes I/O destination information representing an area of an I/O destination. The I/O destination information includes, for example, an LUN (Logical Unit Number) of a logical volume that is the I/O destination and an LBA (Logical Block Address) of an area in the logical volume.

The storage system 200 has a duplexed system. A first system will be referred to as "CH0" and a second system will be referred to as "CH1". Hereinafter, CH0 will be mainly described as an example. CH1 can be understood from the description of CH0. Reference signs of components included in (belonging to) CH0 include the alphabetical character "A", and reference signs of components included in CH1 include the alphabetical character "B".

CH0 includes a storage controller (hereinafter, a controller) 300A and one or more SAS expanders (hereinafter, expanders) 400A coupled to the controller 300A. The one or more expanders 400A are coupled in series. In other words, the expanders 400A are aligned in multiple stages. One or more hard disk drives (hereinafter, drives) 500 are coupled to the expander 400A.

The drive 500 is an example of a non-volatile storage device. A storage device of another type (for example, an SSD (Solid State Drive)) may be adopted in place of, or in addition to, the drive 500. An N-th stage drive 500 is coupled to both N-th stage expanders 400A and 400B. Therefore, the drive 500 is capable of receiving I/O commands from both CH0 and CH1.

It should be noted that high-speed drives and low-speed drives may coexist in the storage system 200. A high-speed drive is, for example, a drive conforming to SAS-3 and having a transfer rate of 12 Gbps. A low-speed drive is, for example, a drive conforming to SAS-2 and having a transfer rate of 6 Gbps. Hereinafter, a high-speed drive will be denoted by the reference sign "500H" and a low-speed drive will be denoted by the reference sign "500L".

In addition, in the present embodiment, it is assumed that both expanders are expanders conforming to SAS-3 or, in other words, expanders with a transfer rate of 12 Gbps.

The controller 300A includes a channel control unit 310A, a CPU (an example of a processor) 320A, a memory 330A, a transfer control unit 340A, a cache memory (hereinafter, a CM) 350A, a shared memory (hereinafter, an SM) 360, and a device control unit 370A.

The channel control unit 310A is an example of a frontend I/F (interface device) and is an I/F for communicating with the host 100 via the LAN 101. The channel control unit 310A receives an I/O request from the host 100.

The transfer control unit 340A is a circuit for controlling data transfer between components in the controller 300A. For example, the transfer control unit 340A transfers an I/O request received by the channel control unit 310A to the CPU 320A. In addition, the transfer control unit 340A is coupled to a transfer control unit 340B.

The CPU 320A executes various processes by executing programs stored in the memory 330A and the like. For example, the CPU 320A processes an I/O request received by the channel control unit 310A. Specifically, for example, based on an I/O destination of the I/O request, the CPU 320A identifies the drive 500 to be an I/O destination of data and transmits an I/O command to the identified drive 500. Data to be input to or output from the drive 500A in accordance with the I/O command may be user data, a part of user data, or parity. The CPU 320A temporarily stores user data in accordance with the I/O request in the CM 350A. The CPU 320A transmits the I/O command to the drive 500 via the device control unit 370A.

The CM 350A temporarily stores user data and the like. The SM 360A stores data (for example, a device management table to be described later) which is shared by the controllers 300A and 300B.

The memory 330A stores programs executed by the CPU 320A and tables used by the CPU 320A. For example, the memory 330 stores a backend configuration program and a backend selection program.

While there may be only one device control unit 370A, in the present embodiment, the device control unit 370A is provided in plurality. The device control unit 370A is an example of a backend I/F and is an I/F for communicating with the drive 500 and the expander 400A. The device control unit 370A internally includes an SAS controller and operates as an initiator device capable of transmitting commands such as an I/O command in accordance with the SAS protocol. One or more expanders 400A are coupled in series to the device control unit 370A. The device control unit 370A and the expander 400A directly coupled to the device control unit 370A are coupled by, for example, a wide link (a logical link which is a set of, for example, four physical links).

For example, a first-stage expander 400A (the expander 400A directly coupled to the device control unit 370A), a plurality of first-stage drives 500, and a second-stage expander 400A are respectively directly coupled. A first-stage expander 400 and a plurality of second-stage drives 500 are respectively directly coupled to a second-stage expander 400. It should be noted that, in the present embodiment, the expander 400 and the drive 500 are sometimes collectively referred to as "SAS devices". In addition, in the present embodiment, a "direct coupling" is a coupling in which another SAS device is not interposed between SAS devices (or between an SAS controller and an SAS expander). In contrast, a coupling in which another SAS device is interposed between SAS devices (or between an SAS controller and an SAS expander) can be referred to as an "indirect coupling".

The CPU 320A is coupled to a plurality of device control units 370A (or one device control unit 370A). The CPU 320A may transmit a command from any of the device control units 370A. Commands transmitted to the expander 400A via the device control unit 370A include an I/O command and an internal process command. An I/O command is a write command or a read command with respect to the drive 500. An internal process command is a control command with respect to the drive 500 or the expander 400A. Examples of an internal process command may include a configuration command for configuring on/off of a buffer of the expander 400A and a health check command for checking a presence or absence of an error such as a link-down.

The expander 400A includes a plurality of ports and a buffer. The drive 500, another expander 400A, or the SAS controller in the device control unit 370A is directly coupled to the ports. On/off of a buffer of the expander 400A can be configured with respect to each port to which the drive 500 is coupled. In the present embodiment, it is assumed that a port with which on/off of a buffer is associated is limited to ports to which the drive 500 is directly coupled. The expander 40 OA buffers commands via ports configured to buffer-on but does not buffer commands via ports configured to buffer-off.

In one expander 400A, on/off of a buffer can be configured differently for each port. However, in the present embodiment, as shown in FIG. 1, buffer-on is configured with respect to all ports of all of the expanders 400A and buffer-off is configured with respect to all ports of all of the expanders 400B. In other words, in the present embodiment, buffer-on is configured with respect to all ports included in CH0 and buffer-off is configured with respect to all ports included in CH1.

Therefore, in the present embodiment, a selection of any of CH0 and CH1 as a command path corresponds to a selection of enabling or disabling buffering of a command by the expander 400. For example, when a destination of a command is the low-speed drive 500L, the controller 300A selects CH0 as the command path. Accordingly, a command addressed to the low-speed drive 500L is to be buffered by the expander 400A which includes a port to which the low-speed drive 500L is directly coupled, and the command is subsequently transferred to the low-speed drive 500L. On the other hand, when a destination of a command is the high-speed drive 500H, the controller 300A selects CH1 as the command path. Accordingly, a command addressed to the high-speed drive 500H is to be transferred to the high-speed drive 500H by the expander 400B which includes a port to which the high-speed drive 500H is directly coupled without being buffered.

Figures 2, 3:
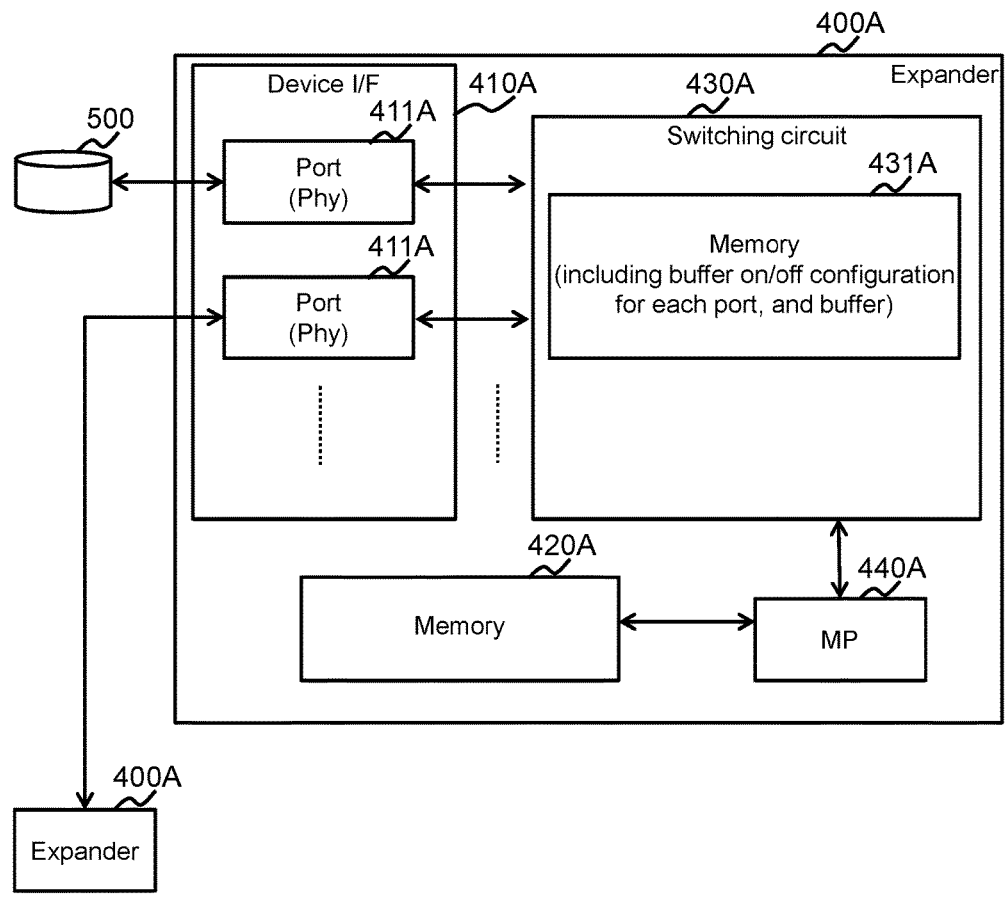
FIG. 2 shows a configuration of a device management table according to Embodiment 1.
FIG. 3 shows a configuration of an expander according to Embodiment 1.

FIG. 2 shows a configuration of a device management table.

A device management table 361A is a table stored by the controller 300A (a table stored in, for example, the SM 360A). The device management table 361A includes an entry for each drive 500 coupled to the device control unit 370A (the SAS controller). Information stored in an entry includes a device number 201A, a transfer rate 202A, a CH0 queue counter 203A, and a CH1 queue counter 204A.

The device number 201A is an identification number of the drive 500. The transfer rate 202A represents a transfer rate of the drive 500. The CH0 queue counter 203A indicates the number of commands transmitted to the drive 500 via CH0 of which processing has not been completed (commands for which a response has not been issued). The CH1 queue counter 204A indicates the number of commands transmitted to the drive 500 via CH1 of which processing has not been completed.

FIG. 3 shows a configuration of the expander 400A.

The expander 400A is, for example, an LSI (Large Scale Integration). The expander 400A includes a device I/F 410A, a switching circuit 430A, a memory 420A, and an MP (microprocessor) 440A.

The device I/F 410A is an interface device for communicating with an SAS device. The device I/F 410A includes a plurality of ports (phy) 411A. The drive 500 or another expander 400A is directly coupled to the ports 411A. When the expander 400A is at a foremost stage, some ports 411A may be directly coupled to the device control unit 370A.

The switching circuit 430A is a hardware circuit for performing routing. A plurality of the ports 411A and the MP (microprocessor) 440A are coupled to the switching circuit 430A. The switching circuit 430A includes a memory 431A. The memory 431A stores a routing table or the like for routing. In addition, the memory 431A includes a configuration of on/off of a buffer for each port 411A and a buffer. The switching circuit 430A controls, in accordance with a configuration of on/off of a buffer associated with a port 411A, whether or not to buffer a command via the port 411A. When buffering the command, the switching circuit 430A stores the command in the buffer.

The memory 420A stores information and computer programs such as a device I/F table and a control program (for example, firmware). The device I/F table includes a status (for example, "Ready" signifying that communication is enabled or "Not-ready" signifying that communication is disabled) for each port 411A. By being executed by the MP 440A, for example, the control program controls enabling/disabling of the port 411A, detects a status of each port 411A by polling each port 411A, broadcasts error information when an error is detected, and processes a command (for example, an I/O command or an internal process control program) received from the device control unit 370A in accordance with the command.

Hereinafter, processes performed in the present embodiment will be described.

Figure 4:
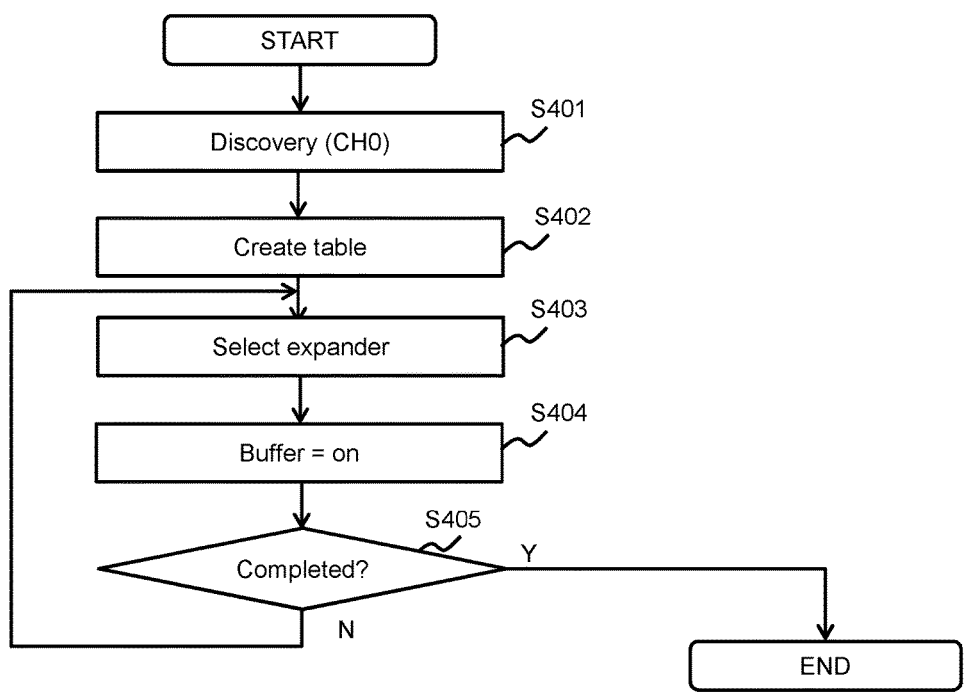
FIG. 4 shows a flow of a CH0 buffer configuration process according to Embodiment 1.

FIG. 4 shows a flow of a CH0 buffer configuration process according to Embodiment 1.

The CH0 buffer configuration process is executed when the CPU 320A executes a backend configuration program (not shown) during initial configuration of the storage system 200 or the like.

The CPU 320A executes discovery of the expander 400A and the drive 500 directly coupled to the expander 400A (S401). The discovery enables the CPU 320A to acquire information related to the expander 400A included in CH0 and information on the transfer rate and the like of the drive 500 directly coupled to the expander 400A. In other words, the expander 400A included in CH0 and the drive 500 directly coupled to the expander 400A are identified.

Next, the CPU 320A creates the device management table 361A in the SM 360A (or the CM 350A) (S402). Specifically, the CPU 320A creates an entry for each drive 500 identified in S401 and configures information including the information such as a transfer rate acquired in S401 in the entry.

Next, the CPU 320A selects one expander 400A from the expanders 400A identified in S401 (S403), and configures buffer-on with respect to all ports 411A to which the drive 500 is respectively coupled in the selected expander 400A (S404). S403 and S404 are performed for all expanders 400A identified in S401 (S405).

Figure 5:
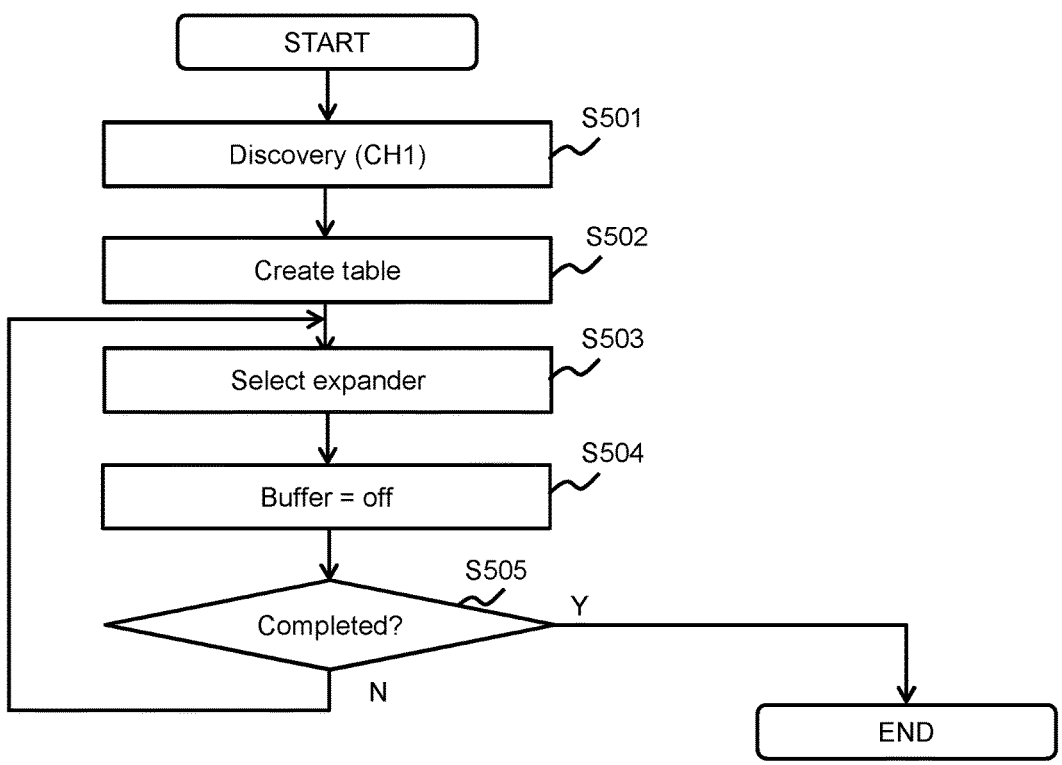
FIG. 5 shows a flow of a CH1 buffer configuration process according to Embodiment 1.

FIG. 5 shows a flow of a CH1 buffer configuration process according to Embodiment 1.

The CH1 buffer configuration process is executed when the CPU 320B executes a backend configuration program (not shown) during initial configuration of the storage system 200 or the like.

Processes similar to those of S401 to S403 in FIG. 4 are executed for CH1 (S501 to S503). Accordingly, a device management table 361B is stored in the SM 360B (or the CM 350B). In S504, the CPU 320B configures buffer-off with respect to all ports 411A to which the drive 500 is respectively coupled in the expander 400B selected in S503 (S504). S503 and S504 are performed for all expanders 400B identified in S501 (S505).

According to FIGS. 4 and 5, buffer-on is configured with respect to all ports in CH0 and buffer-off is configured with respect to all ports in CH1. Therefore, there is no need to be conscious of configuring each drive 500 to buffer-on or buffer-off based on a transfer rate of the drive 500.

Figure 6:
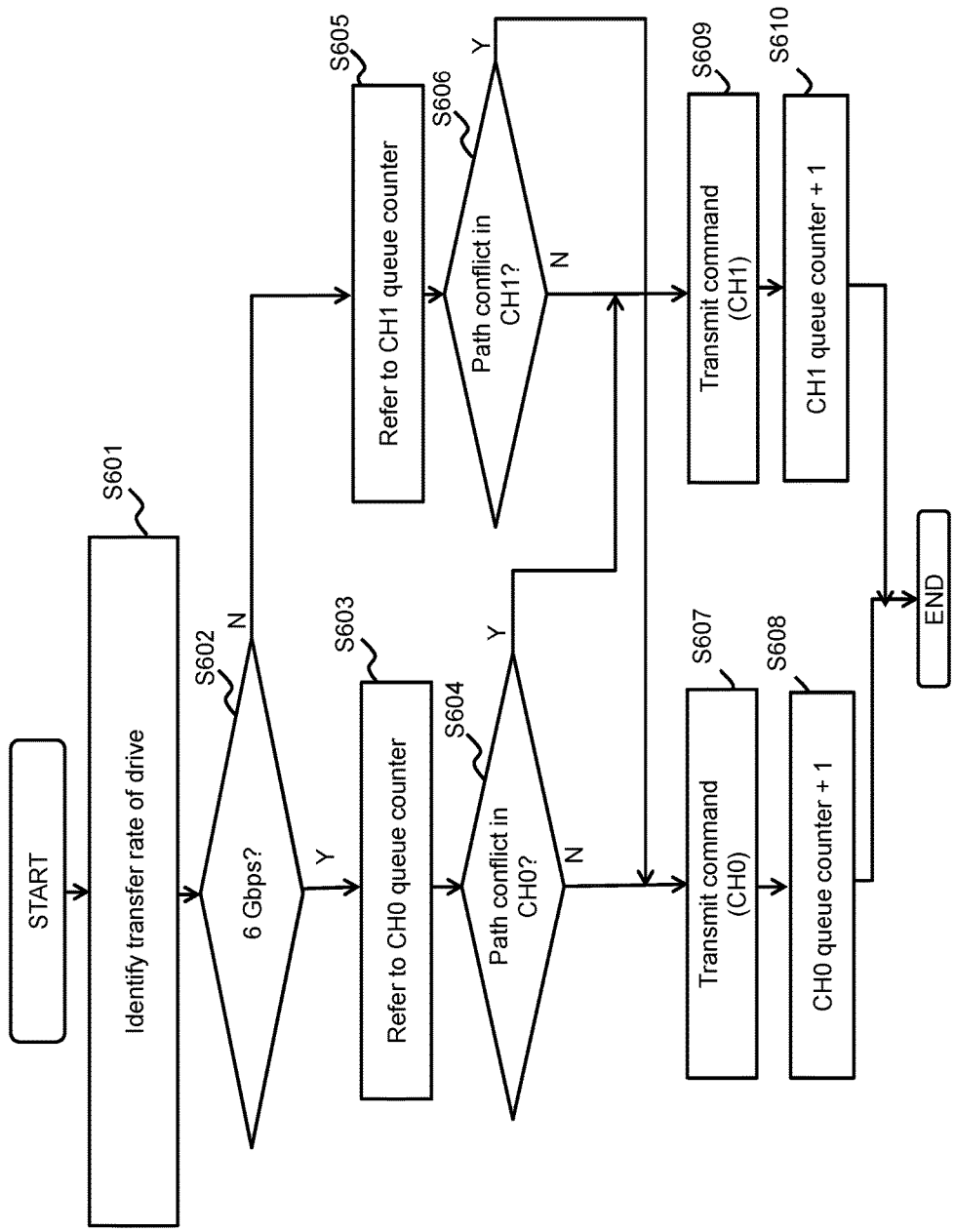
FIG. 6 shows a flow of a command issuance process according to Embodiment 1.

FIG. 6 shows a flow of a command issuance process according to Embodiment 1.

The command issuance process is executed when the CPU 320A executes a backend selection program (not shown). A command issued in the command issuance process may be an I/O command which is issued when the controller 300A receives an I/O request from the host 100 or may be the internal process command described earlier.

The CPU 320A identifies a transfer rate of a drive 500 serving as a destination of the command from the device management table 361A (S601).

Next, the CPU 320A determines whether or not the transfer rate identified in S601 is 6 Gbps (S602).

When a result of the determination in S602 is positive (S602: Y), the CPU 320A refers to the CH0 queue counter 203A corresponding to the destination low-speed drive 500L (S603), and determines whether or not a path conflict has occurred in CH0 (S604). Whether or not a path conflict has occurred in CH0 signifies whether or not a path to the destination drive in CH0 is congested and is, for example, whether or not a value of the CH0 queue counter 203A is equal to or larger than a prescribed value P.

When a result of the determination in S604 is negative (S604: N), the CPU 320A transmits a command to the destination low-speed drive 500L from the device control unit 370A (S607) and respectively adds 1 to the CH0 queue counters 203A and 203B corresponding to the destination low-speed drive 500L (S608). When the result of the determination in S604 is positive (S604: N), the CPU 320A transmits a command to the destination low-speed drive 500L from the device control unit 370B (S609) and respectively adds 1 to the CH1 queue counters 204A and 204B corresponding to the destination low-speed drive 500L (S610).

When the result of the determination in S602 is negative (in other words, when the transfer rate of the destination drive 500 is 12 Gbps) (S602: N), the CPU 320A refers to the CH1 queue counter 204A corresponding to the destination high-speed drive 500H (S605), and determines whether or not a path conflict has occurred in CH1 (S606). Whether or not a path conflict has occurred in CH1 signifies whether or not a path to the destination drive in CH1 is congested and is, for example, whether or not a value of the CH1 queue counter 204A is equal to or larger than a prescribed value Q.

When a result of the determination in S606 is negative (S606: N), the CPU 320A transmits a command to the destination high-speed drive 500H from the device control unit 370B (S609) and respectively adds 1 to the CH1 queue counters 204A and 204B corresponding to the destination high-speed drive 500H (S610). When the result of the determination in S606 is positive (S606: Y), the CPU 320A transmits a command to the destination high-speed drive 500H from the device control unit 370A (S607) and respectively adds 1 to the CH0 queue counters 203A and 203B corresponding to the destination high-speed drive 500H (S608).

When emphasizing I/O performance of the high-speed drive 500H, the threshold Q (a threshold to be compared with the CH1 queue counter 204A) may be smaller than the threshold P (a threshold to be compared with the CH0 queue counter 203A) (in other words, P>Q). Accordingly, it is expected that a load on CH1 is to be preferentially reduced.

Figure 7:
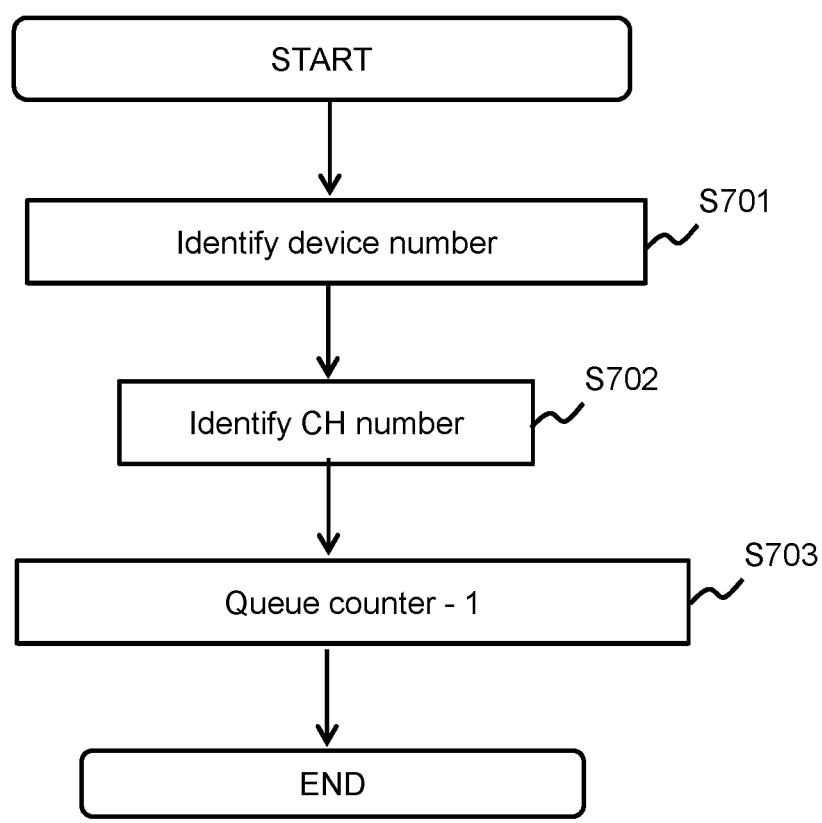
FIG. 7 shows a flow of a response reception process according to Embodiment 1.

FIG. 7 shows a flow of a response reception process according to Embodiment 1.

When the CPU 320 receives a response to a command, the CPU 320 identifies a device number of a transmission source drive 500 of the received response (S701), and identifies a number (CH number) of the system being a path of the response (S702). In addition, the CPU 320A respectively subtracts 1 from values of the queue counters (203A and 203B or 204A and 204B) corresponding to the response transmission source drive and the identified CH number (S703).

According to the present embodiment, which of CH0 and CH1 is to be used as a command path is selected according to a transfer rate of the destination drive 500. The selection of the command path corresponds to a selection of whether or not buffering is to be performed. Therefore, whether or not buffering is to be performed can be controlled without switching between on/off configurations of a buffer. It should be noted that, according to the processes shown in FIGS. 6 and 7, since a queue counter is updated in both the device management tables 361A and 361B, the device management tables 361A and 361B have same contents. However, instead of updating both the CH0 queue counters 203A and 203B, one of the CH0 queue counters 203A and 203B may be updated and, when checking whether or not a path conflict has occurred in CH0 (S604), both of the CH0 queue counters 203A and 203B may be referred to. This may similarly apply to the CH1 queue counters 204A and 204B.

Embodiment 2

Embodiment 2 will now be described. In the present embodiment, differences from Embodiment 1 will be mainly described and descriptions of similarities with Embodiment 1 will be either omitted or simplified.

In Embodiment 1, when a path conflict causes a system not suitable for a transfer rate of a destination drive to be selected as a command path to the destination drive (refer to FIG. 6), the following problems may occur.

For example, when CH1 is selected as the command path despite the low-speed drive 500L being the destination drive, buffering of a command is not performed despite the low-speed drive 500L being the destination drive. Therefore, a connection between the device control unit 370B and the destination low-speed drive 500L must be established. Performance may decline when difficulties arise in establishing the connection.

In addition, for example, when CH0 is selected as the command path despite the high-speed drive 500H being the destination drive, buffering of a command is performed despite the high-speed drive 500H being the destination drive. This may prevent the transfer rate of the high-speed drive 500H from being fully exhibited.

In consideration thereof, in Embodiment 2, when a system which differs from a system suitable for a transfer rate of the destination drive 500 is selected, an AWT (Arbitration Wait Time) configured in an OAF (Open Address Frame) which is used for establishing a connection is adjusted so as to improve priority.

Hereinafter, Embodiment 2 will be described in detail.

For example, when establishing a connection for command reception, the MP 440A of the expander 400A determines an establishment of the connection based on an AWT of an OAF transmitted in advance. In the present embodiment, when the MP 440A receives an OAF, the MP 440A executes a process (an AWT adjustment process) for adjusting an AWT used to determine an establishment of a connection. Details of this process will be provided later.

Figure 8:
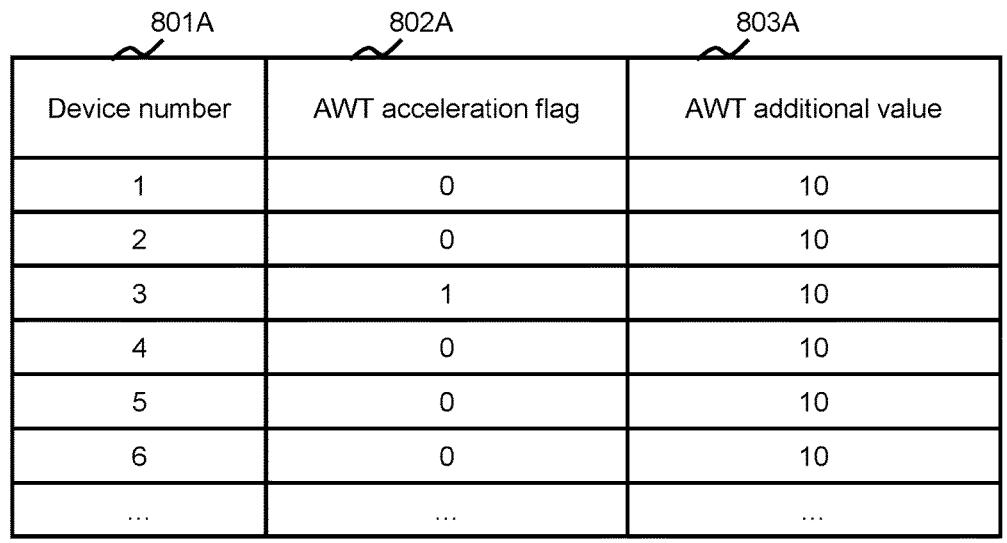
FIG. 8 shows a configuration of an AWT acceleration table according to Embodiment 2.

FIG. 8 shows a configuration of an AWT acceleration table 421A.

The memory 420A of the expander 400A stores the AWT acceleration table 421A. The AWT acceleration table 421A represents, for each drive 500, whether or not a value needs to be added to an AWT and the value to be added. Specifically, the AWT acceleration table 421A includes an entry for each drive 500. Information stored in an entry includes a device number 801A, an AWT acceleration flag 802A, and an AWT additional value 803A.

The device number 801A is an identification number of the drive 500. The AWT acceleration flag 802A indicates whether or not a value needs to be added to an AWT which is used when making a determination upon establishment of a connection with the drive 500. As the AWT acceleration flag 802A, "1" signifies that a value is to be added to the AWT and "0" signifies that a value is not to be added to the AWT. The AWT additional value 803A represents a value to be added to an AWT which is used when making a determination upon establishment of a connection with the drive 500.

Generally, the expander 400A uses an AWT to determine which drive 500 is to be prioritized as a destination of a command or a source of a command. Typically, the expander 400A prioritizes the drive 500 with a highest AWT.

Figure 9:
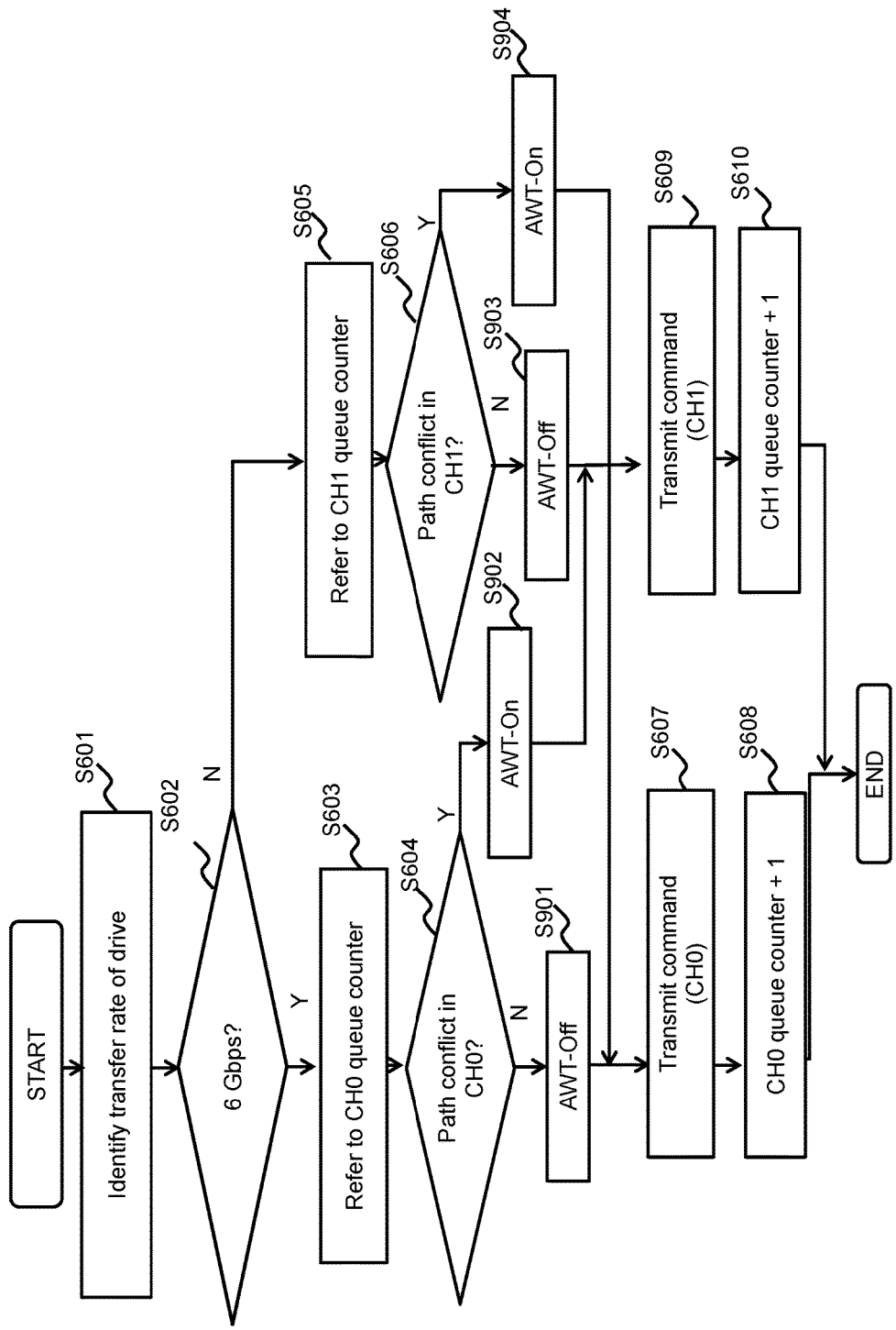
FIG. 9 shows a flow of a command issuance process according to Embodiment 2.

FIG. 9 shows a flow of a command issuance process according to Embodiment 2.

When the result of the determination in S604 is negative (S604: N), the CPU 320A executes an AWT acceleration-off process with respect to the destination low-speed drive 500L (S901). When the result of the determination in S604 is negative (S604: Y), the CPU 320A executes an AWT acceleration-on process with respect to the destination low-speed drive 500L (S902).

When the result of the determination in S606 is positive (S606: Y), the CPU 320A executes the AWT acceleration-on process (S904). When the result of the determination in S606 is negative (S606: N), the CPU 320A executes the AWT acceleration-off process (S903).

The AWT acceleration-on process involves raising an AWT acceleration mode flag in an OAF to be used to establish a connection (setting the flag to "1"). On the other hand, the AWT acceleration-off process involves lowering the AWT acceleration mode flag in the OAF (setting the flag to "0"). An SAS device (the expander 400A or the drive 500) having received an OAF can determine whether or not a value needs to be added to an AWT based on the state of the AWT acceleration mode flag in the OAF. Specifically, when the AWT acceleration mode flag in the received OAF is raised, the SAS device adds a value to the AWT. On the other hand, when the AWT acceleration mode flag in the received OAF is lowered, the SAS device does not add a value to the AWT (or subtracts a value from the AWT).

For example, a value is subtracted from an AWT corresponding to a prioritized drive 500. Accordingly, the AWT of the drive 500 relatively decreases and the likelihood of another drive 500 being prioritized next increases. Accordingly, all drives 500 end up being uniformly prioritized.

However, in Embodiment 1, since the problems described above arise in Embodiment 1, it is not favorable to uniformly prioritize all drives 500.

In consideration thereof, in Embodiment 2, as shown in FIG. 9, controlling on/off of the AWT acceleration mode flag creates an imbalance between a prioritized drive and a drive which is not prioritized.

Specifically, for example, when a destination is the low-speed drive 500L and a path conflict has occurred in CH0, a value of the AWT corresponding to the low-speed drive 500L relatively increases. Accordingly, when a command path is in CH1 (a path not subjected to buffering), a connection between the device control unit 370B and the destination low-speed drive 500L is more readily established.

In addition, for example, when a destination is the high-speed drive 500H and a path conflict has occurred in CH1, a value of the AWT corresponding to the high-speed drive 500H relatively increases. Accordingly, when a command path is in CH0 (a path subjected to buffering), a connection between the device control unit 370A and the destination high-speed drive 500H is more readily established.

The AWT adjustment process is performed by either the expander 400A or a drive. In other words, in the present embodiment, the AWT adjustment process shown in either FIG. 10 or 11 is adopted.

Figure 10:
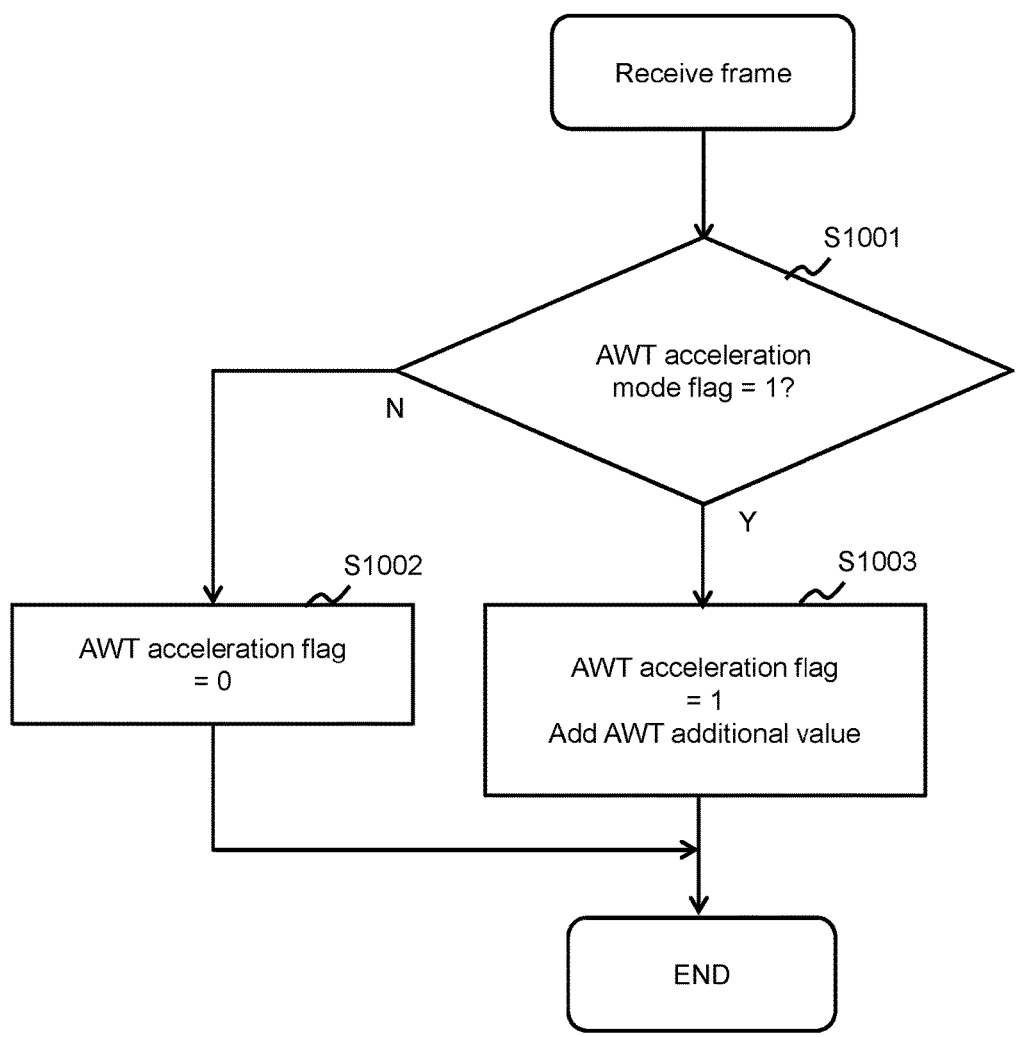
FIG. 10 shows a flow of an AWT adjustment process (an AWT adjustment process by an expander) according to Embodiment 2.
Figure 11:
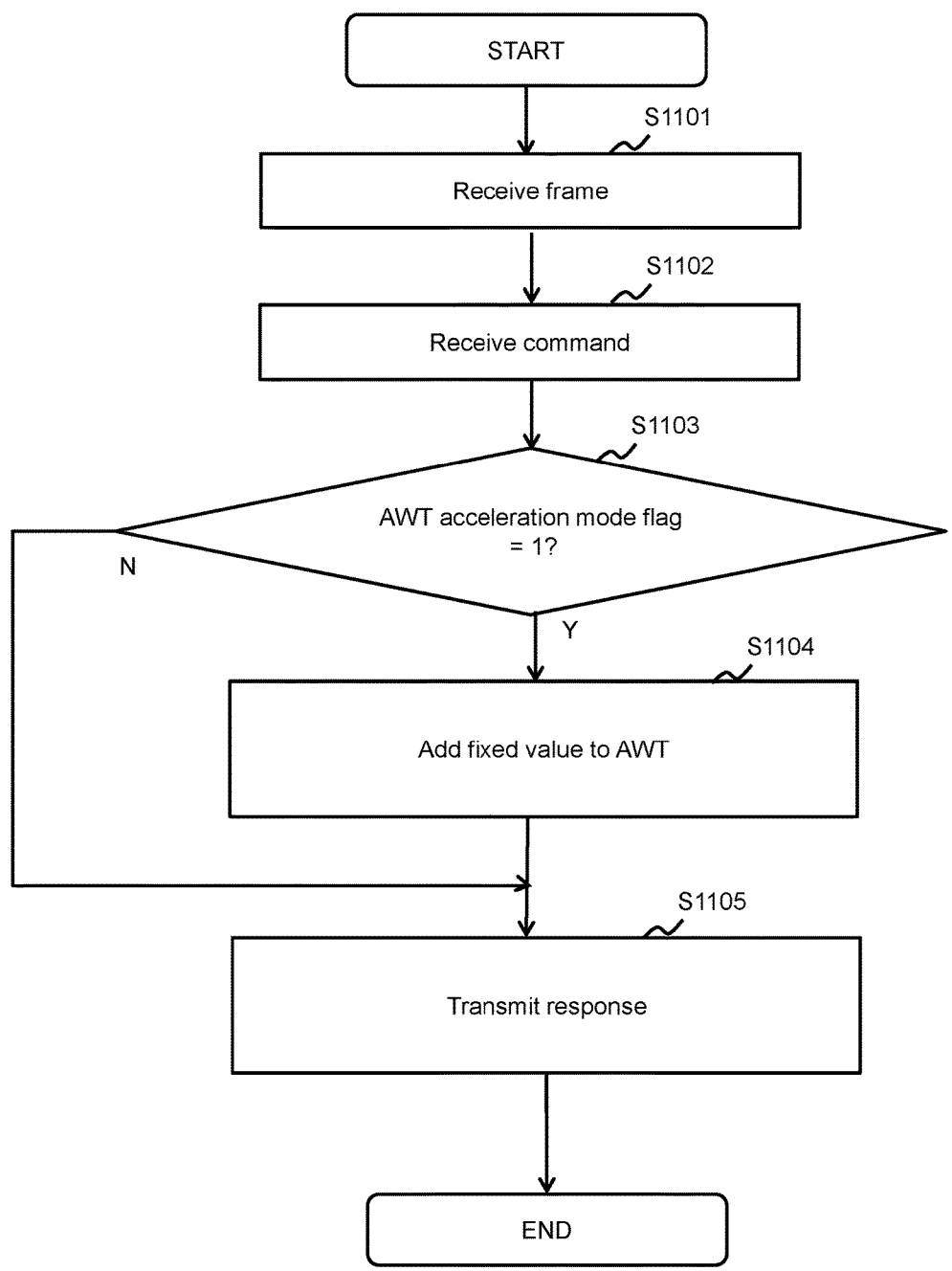
FIG. 11 shows a flow of an AWT adjustment process (an AWT adjustment process by a drive) according to Embodiment 2.

FIG. 10 shows a flow of an AWT adjustment process by the expander 400A.

The MP 440A determines whether or not an AWT acceleration mode flag in a received OAF is raised (S1001).

When a result of the determination in S1001 is negative (S1001: N), the MP 440A sets a value of the AWT acceleration flag 802A corresponding to the drive 500 serving as a destination of a command corresponding to the OAF to "0" (S1002).

On the other hand, when the result of the determination in S1001 is positive (S1001: Y), the MP 440A sets the value of the AWT acceleration flag 802A corresponding to the drive 500 serving as the destination of the command corresponding to the OAF to "1" and adds a value represented by the AWT additional value 803A corresponding to the destination drive 500 to the AWT of the OAF (S1003).

Based on the AWT adjusted by this AWT adjustment process, the MP 440A determines whether or not to establish a connection based on the OAF. The MP 440A preferentially establishes a connection from the drive 500 with a largest AWT value. Therefore, when the AWT acceleration mode flag in the OAF is raised, a priority of establishing a connection increases. As a result, when a path conflict occurs and a command is issued from another system, a priority of establishing a connection for transmitting the command can be increased and, consequently, a decline in performance can be prevented.

FIG. 11 shows a flow of an AWT adjustment process by the drive 500.

The drive 500 receives an OAF (S1101) and receives an SCSI command (S1102). The drive 500 determines whether or not an AWT acceleration mode flag in the received OAF is raised (S1103).

When a result of the determination in S1103 is negative (S1103: N), the drive 500 advances the process to step S1105.

On the other hand, when the result of the determination in S1103 is positive (S1103: Y), the drive 500 adds a prescribed value to the AWT at the time of a response to the received SCSI command (S1104) and advances the process to S1105.

In S1105, the drive 500 includes the AWT in a response to the command and transmits the response. Accordingly, the expander 400A having received the response controls establishment of a connection based on the AWT included in the response. When the AWT acceleration mode flag in the OAF is raised, a priority of establishing a connection increases. Therefore, when a path conflict occurs and a command is to be issued from another system, a priority of establishing a connection for transmitting the command can be increased and, as a result, a decline in performance can be prevented.

Embodiment 3

Embodiment 3 will now be described. In the present embodiment, differences from Embodiment 1 or 2 will be mainly described and descriptions of similarities with Embodiment 1 or 2 will be either omitted or simplified.

In Embodiments 1 and 2, with respect to the low-speed drive 500L, when a path conflict occurs in CH0, a command is issued from CH1. In CH1, buffering is not performed by the expander 400B. Therefore, a transfer rate of CH1 is dependent on the transfer rate of the low-speed drive 500L and throughput of CH1 declines.

In consideration thereof, in Embodiment 3, buffering is to be performed for the low-speed drive 500L even in CH1. Accordingly, a decline in throughput with respect to the low-speed drive 500L in CH1 can be prevented.

Hereinafter, Embodiment 3 will be described in detail.

In the present embodiment, in CH1, the SM 360B stores a device management table 362B in place of the device management table 361B.

FIG. 12 shows a configuration of the device management table 362B.

Information stored in each entry of the device management table 362B further includes a CH0 buffer 205B and a CH1 buffer 206B. The CH0 buffer 205B represents on/off of a buffer with respect to a port of CH0 (the expander 400A) to which the drive 500 is directly coupled. The CH1 buffer 206B represents on/off of a buffer with respect to a port of CH1 (the expander 400B) to which the drive 500 is directly coupled.

Figure 13:
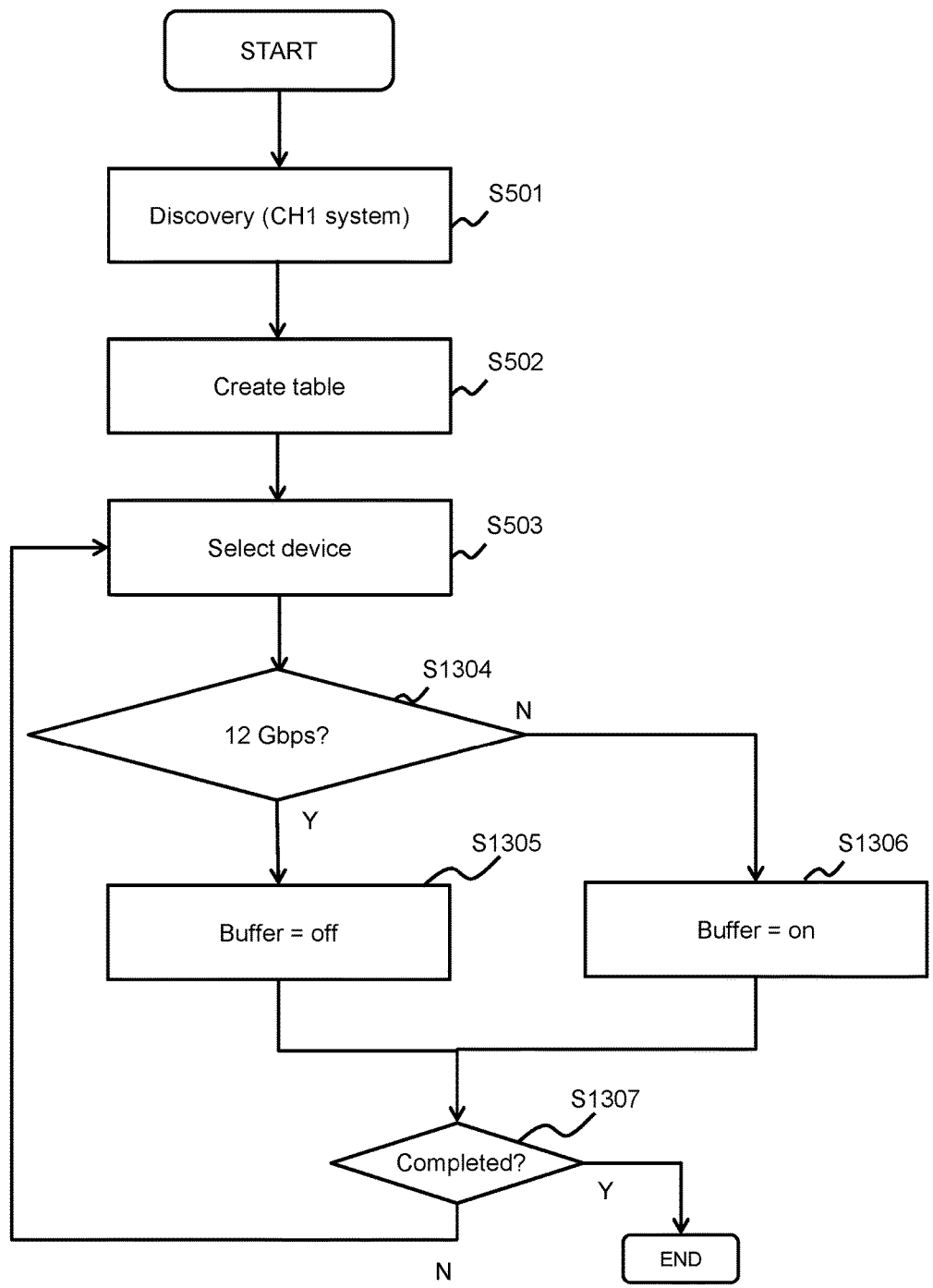
FIG. 13 shows a flow of a CH1 buffer configuration process according to Embodiment 3.

FIG. 13 shows a flow of a CH1 buffer configuration process according to Embodiment 3.

S501 to S503 are as described with reference to FIG. 5. The CPU 320B determines whether or not a transfer rate 202B corresponding to a selected drive 500 is 12 Gbps (high speed) (S1304).

When a result of the determination in S1304 is positive (S1304: Y), the CPU 320B configures buffer-off with respect to the port to which the drive 500 is directly coupled and configures "Off" as the CH1 buffer 206B corresponding to the drive 500 (S1305). On the other hand, when the result of the determination in S1304 is negative (S1304: N), the CPU 320B configures buffer-on with respect to the port to which the drive 500 is directly coupled and configures "On" as the CH1 buffer 206B corresponding to the drive 500 (S1306).

According to the present embodiment, with respect to the low-speed drive 500L, buffer-on is configured in both CH0 and CH1. As a result, a decline in throughput in CH1 can be prevented.

It should be noted that the command issuance process shown in FIG. 9 is adopted as the command issuance process in the present embodiment. For example, when the destination drive is the low-speed drive 500L and CH1 is selected as a command path, an AWT acceleration-on process may be executed (S902). In the present embodiment, steps other than S902 among S901 to S904 may not be adopted. In addition, the command issuance process shown in FIG. 5 may be adopted in place of the command issuance process shown in FIG. 9.

Embodiment 4

Next, Embodiment 4 will be described. In the present embodiment, differences from Embodiment 1 or 2 will be mainly described and descriptions of similarities with Embodiment 1 or 2 will be either omitted or simplified.

In Embodiments 1 and 2, when the destination drive is the low-speed drive 500L, CH0 is preferentially selected as a command path and, when the destination drive is the high-speed drive 500H, CH1 is preferentially selected as the command path. Therefore, when there is a large difference between the number of the low-speed drives 500L and the number of the high-speed drives 500H, load concentrates on one of the systems. As a result, throughput may decline.

In consideration thereof, a mode in which load is balanced between CH0 and CH1 is provided in Embodiment 4.

Hereinafter, a mode in which load is not balanced between CH0 and CH1 will be referred to as a "basic mode" and a mode in which load is balanced between CH0 and CH1 will be referred to as a "balanced mode".

Figure 14:
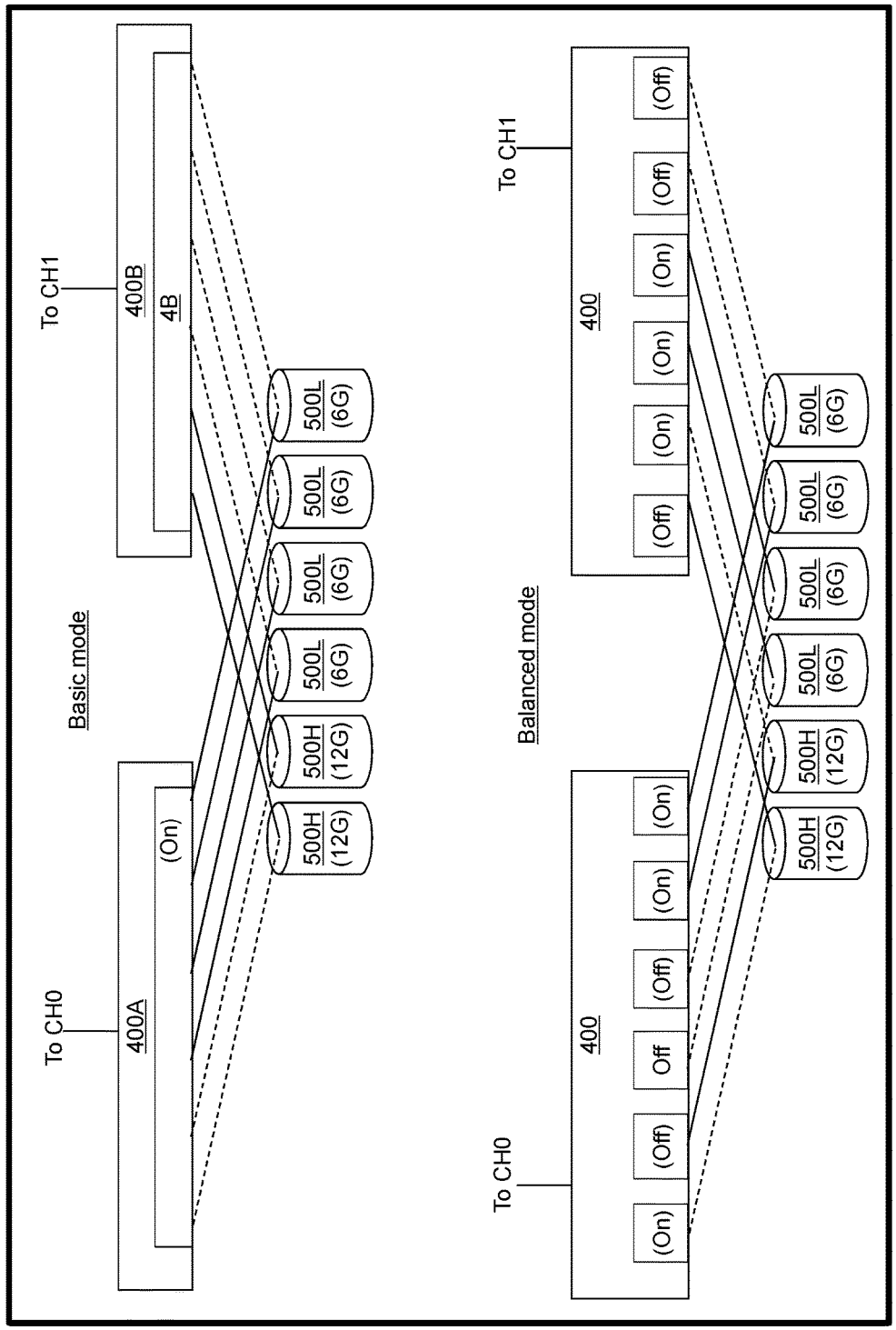
FIG. 14 shows an outline of Embodiment 4.

FIG. 14 shows an outline of the present embodiment. As shown, in the present embodiment, a link which couples an expander and a drive to each other is a priority link or a non-priority link. Priority links are depicted by solid lines and non-priority links are depicted by dashed lines.

In the present embodiment, when the difference between the number of the low-speed drives 500L and the number of the high-speed drives 500H is small, the basic mode is adopted. According to the basic mode, a similar configuration to Embodiments 1 and 2 is constructed.

In other words, when the destination drive is the low-speed drive 500L, CH0 is preferentially selected as a command path. Therefore, the link between the expander 400A and the low-speed drive 500L is a priority link. The link between the expander 400A and the high-speed drive 500H is a non-priority link.

When the destination drive is the high-speed drive 500H, CH1 is preferentially selected as a command path. Therefore, the link between the expander 400B and the high-speed drive 500H is a priority link. The link between the expander 400B and the low-speed drive 500L is a non-priority link.

According to the shown example of the basic mode, since there are more low-speed drives 500L than high-speed drives 500H, priority links concentrate in CH0 (four out of six links are priority links) and the load on CH0 may increase.

On the other hand, in the present embodiment, when the difference between the number of the low-speed drives 500L and the number of the high-speed drives 500H is large, the balanced mode is adopted. According to the balanced mode, priority links and non-priority links are present in equal proportion in both CH0 and CH1. Specifically, among the six links, half are priority links and the other half are non-priority links.

Specifically, in the balanced mode, the number of high-speed drives 500H prioritized by one system and the number of high-speed drives 500H prioritized by the other system are balanced. In a similar manner, the number of low-speed drives 500L prioritized by one system and the number of low-speed drives 500L prioritized by the other system are balanced.

In addition, buffer-off is configured with respect to a port of which a link to the high-speed drive 500H is a priority link, and buffer-on is configured with respect to a port of which a link to the high-speed drive 500H is a non-priority link. On the other hand, buffer-on is configured with respect to a port of which a link to the low-speed drive 500L is a priority link, and buffer-off is configured with respect to a port of which a link to the low-speed drive 500L is a non-priority link.

According to the balanced mode described above, a load can be balanced between two systems and throughput of a storage system as a whole can be improved.

Hereinafter, the present embodiment will be described in detail.

The SM 360A (360B) stores a device management table 363A (363B) in place of the device management table 361A (361B).

FIG. 15 shows a configuration of the device management table 363A.

Information stored in each entry of the device management table 363A further includes an expander number 1501A, a CH0 buffer 1502A, a CH1 buffer 1503A, and a priority CH 104A.

The expander number 1501A is an identification number of the expander 400A coupled to the drive 500. The CH0 buffer 1502A represents on/off of a buffer with respect to a port of CH0 (the expander 400A) to which the drive 500 is directly coupled. The CH1 buffer 1503A represents on/off of a buffer with respect to a port of CH1 (the expander 400B) to which the drive 500 is directly coupled. The priority CH 1504A is an identification number of a system which is prioritized in command transfer to the drive 500. As the priority CH 1504A, "0" signifies CH0 and "1" signifies CH1.

Figure 16:
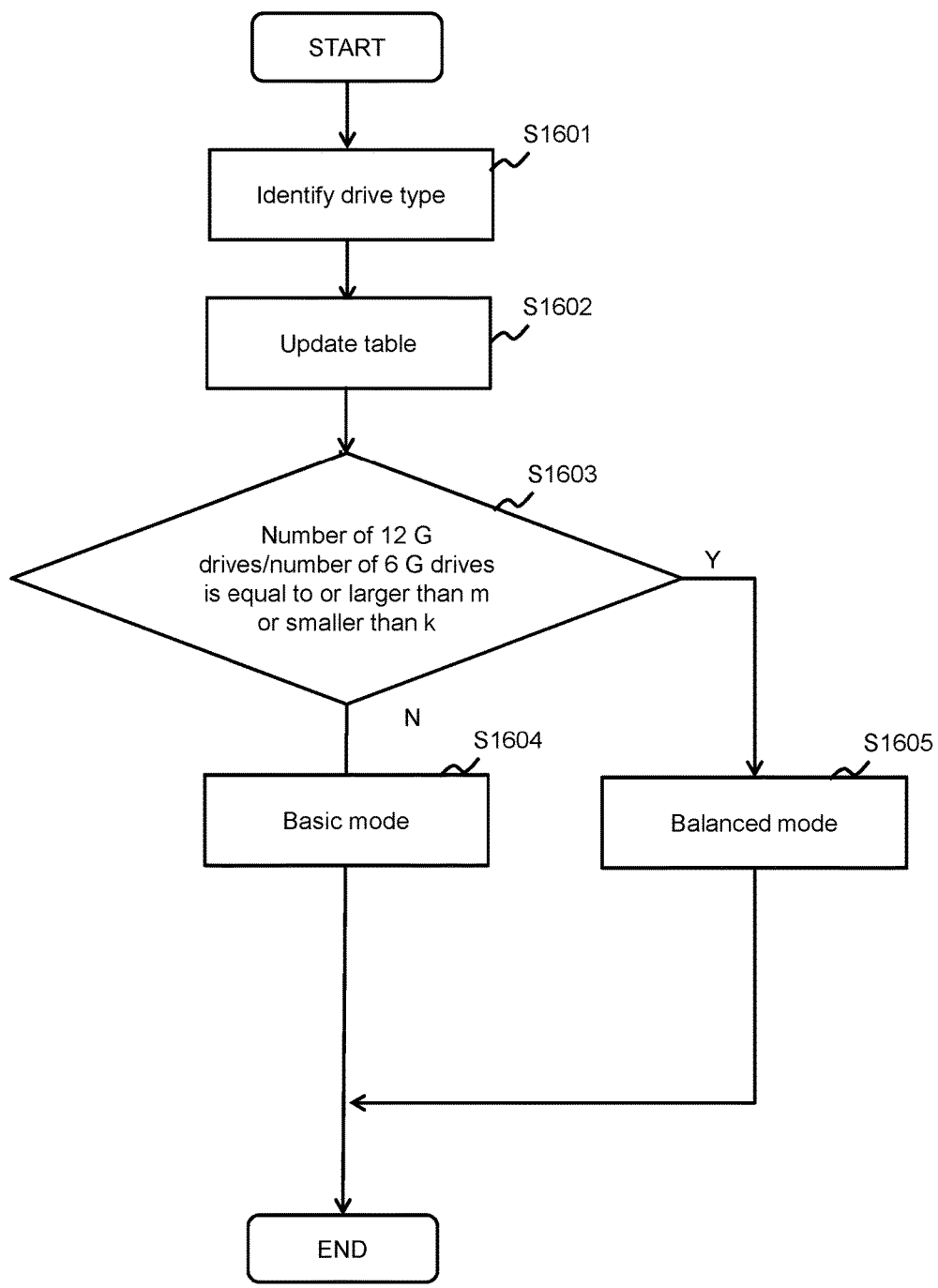
FIG. 16 shows a flow of a buffer mode selection process according to Embodiment 4.

FIG. 16 shows a flow of a buffer mode selection process.

The buffer mode selection process is executed when the CPU 320A executes a backend configuration program (not shown) during initial configuration of the storage system 200.

The CPU 320A identifies information representing a type (a transfer rate or the like) of each drive 500 coupled to CH0 by discovery or the like of the drives 500 coupled to CH0 (S1601), and registers the identified information in a table (for example, a temporary table) (S1602).

Next, based on the table, the CPU 320A determines whether or not a ratio of the number of high-speed drives 500H to the number of low-speed drives 500L is equal to or larger than m or smaller than k (where m>k) (S1603). In this case, respective values of m and k may be arbitrary.

When a result of the determination in S1603 is negative (S1603: N), the CPU 320A selects the basic mode (S1604). When the basic mode is selected, the buffer configuration process shown in FIGS. 4 and 5 is performed.

When the result of the determination in S1603 is positive (S1603: Y), the CPU 320A selects the balanced mode (S1605). When the balanced mode is selected, the buffer configuration process shown in FIG. 17 is performed.

Figure 17:
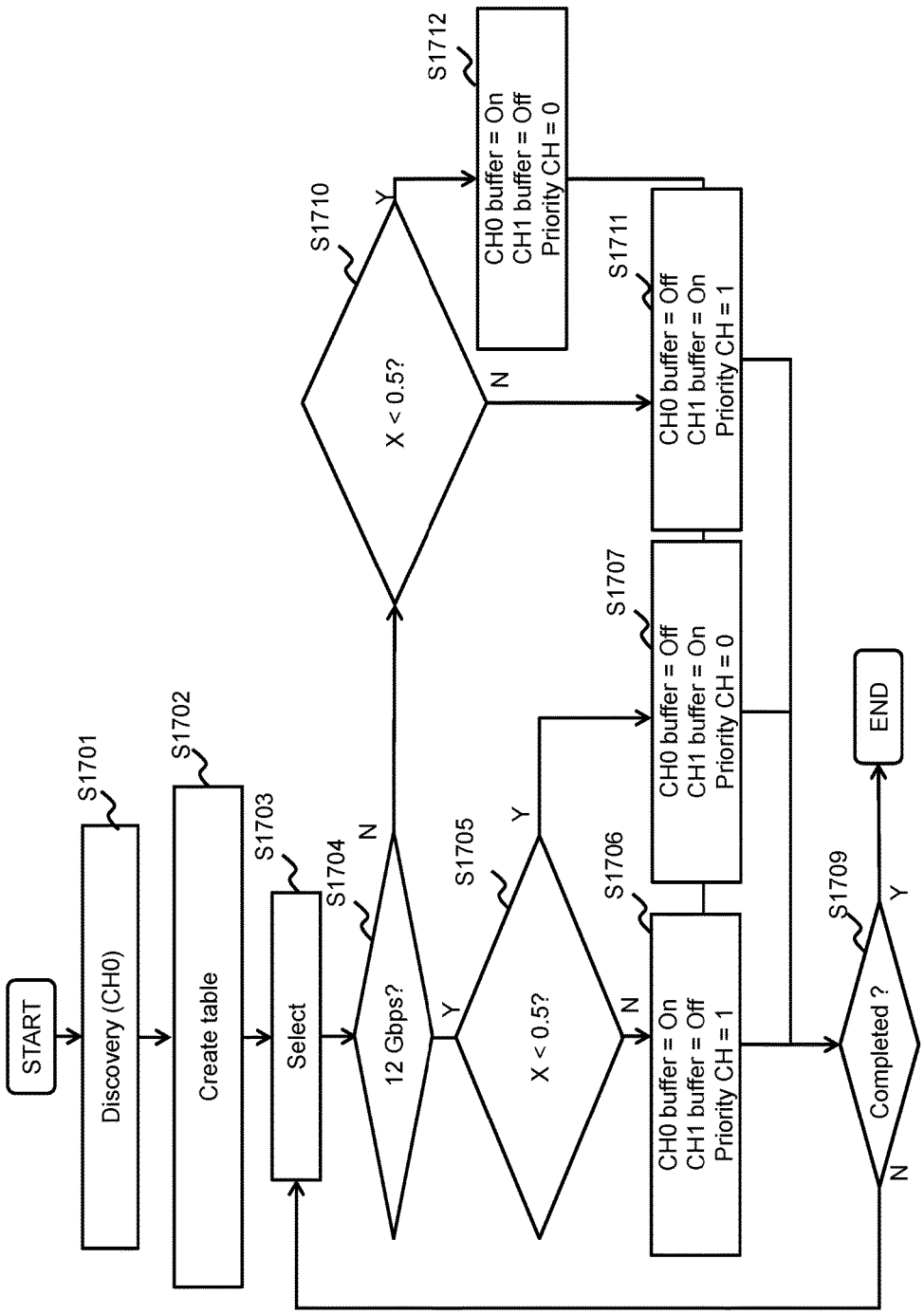
FIG. 17 shows a flow of a CH0 buffer configuration process (balanced mode) according to Embodiment 4.

FIG. 17 shows a flow of a CH0 buffer configuration process (balanced mode) according to Embodiment 4.

The CPU 320A executes discovery of the expander 400 and the drive 500 coupled to CH0 (S1701).

Next, based on the information acquired by the discovery in S1701, the CPU 32A0 creates the device management table 363A in the SM 360 (S1702). Specifically, in each entry of the device management table 363A, the CPU 320A registers pieces of information 201A, 1501A, 202A, 203A, and 204A. The pieces of information 1502A to 1504A are left blank.

Next, the CPU 320A selects one drive 500 (S1703) and determines whether or not the transfer rate of the selected drive 500 is 12 Gbps (high speed) (S1704).

When a result of the determination in S1704 is positive (S1704: Y), the CPU 320A calculates a value X and determines whether or not the value X is smaller than 0.5 (S1705). Alternatively, an arbitrary threshold other than 0.5 may be adopted. In this case, the value X represents X1/X2, where: X1 denotes a total number of drives 500 of which the expander number 1501A and the transfer rate 202A are the same as the expander number 1501A and the transfer rate 202A corresponding to the drive 500 selected in S1703 and of which the priority CH 1504A is "0"; and X2 denotes a total number of drives 500 of which the expander number 1501A and the transfer rate 202A are the same as the expander number 1501A and the transfer rate 202A corresponding to the drive 500 selected in S1703.

When a result of the determination in S1705 is negative (S1705: N), the CPU 320A configures buffer-on with respect to the port (the port of the expander 400A) to which the selected drive 500 is directly coupled, and configures "On" as the CH0 buffer 1502A, "Off" as the CH1 buffer 1503A, and "1" as the priority CH 1504A respectively corresponding to the drive 500 (S1706). In other words, when the priority CH 1504A is CH0 for half or more of the high-speed drives 500H directly coupled to the expander 400A to which the high-speed drive 500H selected in S1703 is directly coupled, CH1 is set as the priority CH 1504A of the selected high-speed drive 500H.

When the result of the determination in S1705 is positive (S1705: Y), the CPU 320A configures buffer-off with respect to the port (the port of the expander 400A) to which the selected drive 500 is directly coupled, and configures "Off" as the CH0 buffer 1502A, "On" as the CH1 buffer 1503A, and "0" as the priority CH 1504A respectively corresponding to the drive 500 (S1706). In other words, when the priority CH 1504A is CH0 for less than half of the high-speed drives 500H directly coupled to the expander 400A to which the high-speed drive 500H selected in S1703 is directly coupled, CH0 is set as the priority CH 1504A of the selected high-speed drive 500H.

As described above, as a result of S1705 to S1707, the number of priority links and the number of non-priority links are equalized with respect to high-speed drives 500H coupled to the same expander 400A. A similar process is performed on low-speed drives 500L coupled to the same expander 400A (S1710 to S1712).

In other words, when the result of the determination in S1704 is negative (S1704: N), the CPU 320A determines whether or not the value X is smaller than 0.5 (S1710). When a result of the determination in S1710 is negative (S1710: N), the CPU 320A configures buffer-off with respect to the port (the port of the expander 400A) to which the selected drive 500 is directly coupled, and configures "Off" as the CH0 buffer 1502A, "On" as the CH1 buffer 1503A, and "1" as the priority CH 1504A respectively corresponding to the drive 500 (S1711). On the other hand, when the result of the determination in S1710 is positive (S1710: Y), the CPU 320A configures buffer-on with respect to the port (the port of the expander 400A) to which the selected drive 500 is directly coupled, and configures "On" as the CH0 buffer 1502A, "Off" as the CH1 buffer 1503A, and "0" as the priority CH 1504A respectively corresponding to the drive 500 (S1712).

S1704 to S1707 and S1710 to S1712 are respectively performed with respect to all of the drives 500 coupled to CH0 (S1709).

This concludes the description of the CH0 buffer configuration process (balanced mode). A flow of the CH1 buffer configuration process (balanced mode) is substantially the same. However, CH0 and CH1 are to have symmetrical configuration contents such that, with respect to a same drive 500, a priority link in CH0 is a non-priority link in CH1.

Figure 18:
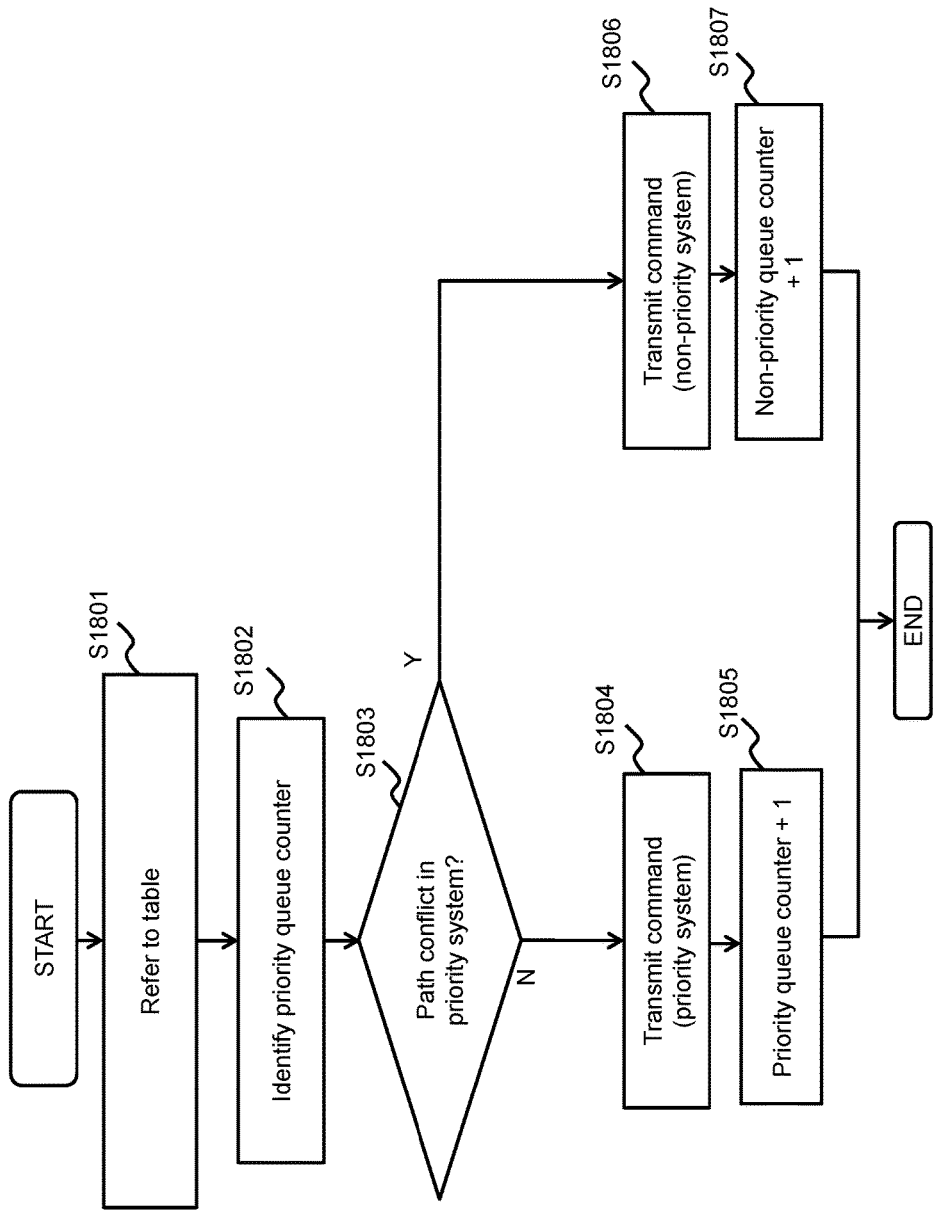
FIG. 18 shows a flow of a command issuance process according to Embodiment 4.

FIG. 18 shows a flow of a command issuance process according to Embodiment 4.

The CPU 320A refers to the device management table 363A using the destination drive 500 as a key (S1801), and identifies a priority queue counter corresponding to the destination drive 500. A priority queue counter refers to a queue counter corresponding to a priority system (a CH represented by the priority CH 1504A corresponding to the destination drive 500) among the queue counters 203A and 204A corresponding to the destination drive 500.

The CPU 320A determines whether or not a path conflict occurs in the priority system (S1803). In the present embodiment, an occurrence of a path conflict is determined when a value of the priority queue counter is equal to or larger than a prescribed value P.

When a result of the determination in S1803 is negative (S1803: N), the CPU 320A transmits a command from the priority system (S1804) and adds 1 to the priority queue counter corresponding to the destination drive 500 (S1805).

On the other hand, when the result of the determination in S1803 is positive (S1803: Y), the CPU 320A transmits a command from a non-priority system (a system that is not a priority system) (S1806) and adds 1 to a non-priority queue counter corresponding to the destination drive 500 (S1807).

According to the present embodiment, commands are preferentially transmitted from a priority system configured in advance. In addition, since buffer-on is configured with respect to a priority link of the low-speed drive 500L, transfer efficiency can be improved. Furthermore, since buffer-off is configured with respect to a priority link of the high-speed drive 500H, time loss of data transfer can be reduced.

While some embodiments have been described above, it should be obvious that the present invention is not limited to the described embodiments and that various modifications can be made without departing from the spirit and scope of the invention.

REFERENCE SIGNS LIST

200 Storage system

The invention claimed is:
1. A storage system, comprising:
a plurality of storage devices;
a first system coupled to the plurality of storage devices; and
a second system coupled to the plurality of storage devices,
the first system including,
one or more serial first SAS expanders having a plurality of first ports respectively coupled to the plurality of storage devices, and
a first controller coupled to the one or more first SAS expanders,
the second system including,
one or more serial second SAS expanders having a plurality of second ports respectively coupled to the plurality of storage devices, and
a second controller coupled to the one or more second SAS expanders,
the first and second controllers coupled so as to be capable of communicating with each other,
with respect to a target storage device which is any of the plurality of storage devices, at least one of the first and second controllers being configured to
configure, in a first SAS expander having a first port directly coupled to the target storage device, buffer-on signifying that buffering is performed by the first SAS expander with respect to the first port; and
configure, in a second SAS expander having a second port directly coupled to the target storage device, buffer-off signifying that buffering is not performed by the second SAS expander with respect to the second port, and
by selecting any of the first system and the second system as a path of a command transmitted by any of the first and second controllers, whether or not the command is to be buffered by the first or second SAS expander directly coupled to a storage device serving as a destination of the command being determined.

2. The storage system according to claim 1, wherein
the plurality of storage devices include a high-speed storage device which is a storage device with a high transfer rate and a low-speed storage device which is a storage device with a low transfer rate,
the target storage device is a low-speed storage device, and
a path of a command addressed to the target storage device is the first system.

3. The storage system according to claim 1, wherein
the plurality of storage devices include a high-speed storage device which is a storage device with a high transfer rate and a low-speed storage device which is a storage device with a low transfer rate,
the target storage device is a high-speed storage device, and
a path of a command addressed to the target storage device is the second system.

4. The storage system according to claim 1, wherein
the plurality of storage devices include a high-speed storage device which is a storage device with a high transfer rate and a low-speed storage device which is a storage device with a low transfer rate,
buffer-on is configured in the one or more first SAS expanders with respect to each of the plurality of first ports,
buffer-off is configured in the one or more second SAS expanders with respect to each of the plurality of second ports, when the storage device serving as the destination of the command is a low-speed storage device and a path to the destination storage device is not congested in the first system, a path of the command is the first system, and
when the storage device serving as the destination of the command is a high-speed storage device and a path to the destination storage device is not congested in the second system, a path of the command is the second system.

5. The storage system according to claim 4, wherein
when the storage device serving as the destination of the command is a low-speed storage device and a path to the destination storage device is congested in the first system, a path of the command is the second system, and
when the storage device serving as the destination of the command is a high-speed storage device and a path to the destination storage device is congested in the second system, a path of the command is the first system.

6. The storage system according to claim 5, wherein
at least one of the first and second controllers is configured to execute control for increasing a value of an AWT (Arbitration Wait Time) which is used as a priority when establishing a connection for transmitting the command both when the storage device serving as the destination of the command is a low-speed storage device and a path to the destination storage device is congested in the first system and when the storage device serving as the destination of the command is a high-speed storage device and a path to the destination storage device is congested in the second system.

7. The storage system according to claim 6, wherein
the control for increasing the value of the AWT involves configuring, in a frame for requesting establishment of the connection for transmitting the command, AWT acceleration-on which is a value signifying that the value of the AWT is to be increased, and
the first or second SAS expander, which has received the frame in which the AWT acceleration-on is configured, is configured to add a value to the AWT when establishing a connection based on the frame and to control establishment of the connection based on the frame based on the AWT to which the value has been added.

8. The storage system according to claim 6, wherein
the control for increasing the value of the AWT involves configuring, in a frame for requesting establishment of the connection for transmitting the command, AWT acceleration-on which is a value signifying that the value of the AWT is to be increased, and
a storage device, which has received the frame in which the AWT acceleration-on is configured, is configured to add a value to the AWT when establishing a connection based on the former frame and to transmit a response including the AWT to which the value has been added.

9. The storage system according to claim 1, wherein
the plurality of storage devices include a high-speed storage device which is a storage device with a high transfer rate and a low-speed storage device which is a storage device with a low transfer rate,
buffer-on is configured in the one or more first SAS expanders with respect to each of the plurality of first ports,
with respect to each of the plurality of second ports, when a storage device directly coupled to the second port is a high-speed storage device, buffer-off is configured in the second SAS expander including the second port, and when a storage device directly coupled to the second port is a low-speed storage device, buffer-on is configured in the second SAS expander including the second port, and
when the storage device serving as the destination of the command is a low-speed storage device,
a path of the command is the first system when a path to the destination storage device is not congested in the first system, and
a path of the command is the second system when a path to the destination storage device is congested in the first system.

10. The storage system according to claim 9, wherein
when the storage device serving as the destination of the command is a high-speed storage device,
a path of the command is the second system when a path to the destination storage device is not congested in the second system, and
a path of the command is the first system when a path to the destination storage device is congested in the second system.

11. The storage system according to claim 10, wherein
at least one of the first and second controllers is configured to execute control for increasing a value of an AWT (Arbitration Wait Time) which is used as a priority when establishing a connection for transmitting the command, both when the storage device serving as the destination of the command is a low-speed storage device and a path to the destination storage device is congested in the first system and when the storage device serving as the destination of the command is a high-speed storage device and a path to the destination storage device is congested in the second system.

12. The storage system according to claim 1, wherein
the plurality of storage devices include a high-speed storage device which is a storage device with a high transfer rate and a low-speed storage device which is a storage device with a low transfer rate, and at least one of the first and second controllers is configured to:

(A) with respect to a high-speed storage device directly coupled to first and second SAS expanders of a same stage, equally distribute links, which directly couple the high-speed storage device to the first and second SAS expanders respectively, into priority links and non-priority links, with respect to a port directly coupled to the priority link, configure buffer-off in an SAS expander including the port, and with respect to a port directly coupled to the non-priority link, configure buffer-on in an SAS expander including the port;

(B) with respect to a low-speed storage device directly coupled to the first and second SAS expanders of the same stage, equally distribute links, which directly couple the low-speed storage device to the first and second SAS expanders respectively, into priority links and non-priority links, with respect to a port directly coupled to the priority link, configure buffer-on in an SAS expander including the port, and with respect to a port directly coupled to the non-priority link, configure buffer-off in an SAS expander including the port; and (C) when transmitting a command, transmit the command via a system to which the priority link of a storage device serving as a destination of the command belongs.

13. The storage system according to claim 12, wherein at least one of the first and second controllers is configured to:

(X) when a ratio of the number of high-speed storage devices to the number of low-speed storage device is within a prescribed range, execute (A) to (C); and (Y) when the ratio is not within the prescribed range, configure buffer-on in the one or more first SAS expanders with respect to each of the plurality of first ports, configure buffer-off in the one or more second SAS expanders with respect to each of the plurality of second ports, and when transmitting a command, transmit the command via the first system when the destination storage device is a low-speed storage device, and transmit the command via the second system when the destination storage device is a high-speed storage device.

14. The storage system according to claim 12, wherein at least one of the first and second controllers is configured to, when transmitting a command, transmit the command via a system to which the non-priority link of a storage device serving as a destination of the command belongs, when a path to the destination storage device is congested in a system to which the priority link of the destination storage device belongs.

15. A method for controlling command transmission in a storage system, the storage system including, a plurality of storage devices, a first system coupled to the plurality of storage devices, and a second system coupled to the plurality of storage devices, the first system including, one or more serial first SAS expanders having a plurality of first ports respectively coupled to the plurality of storage devices, and a first controller coupled to the one or more first SAS expanders, the second system including, one or more serial second SAS expanders having a plurality of second ports respectively coupled to the plurality of storage devices, and a second controller coupled to the one or more second SAS expanders, the first and second controllers being coupled so as to be capable of communicating with each other, the method comprising, with respect to a target storage device which is any of the plurality of storage devices:

configuring, in a first SAS expander having a first port directly coupled to the target storage device, buffer-on signifying that buffering is performed by the first SAS expander with respect to the first port;

configuring, in a second SAS expander having a second port directly coupled to the target storage device, buffer-off signifying that buffering is not performed by the second SAS expander with respect to the second port; and selecting any of the first system and the second system as a path of a command transmitted by any of the first and second controllers, to determine whether or not the command is to be buffered by the first or second SAS expander directly coupled to a storage device serving as a destination of the command.

* * * * *